J. W. & D. R. BRYAN.

APPARATUS FOR SORTING HETEROGENEOUS MATERIAL.

APPLICATION FILED MAR. 25, 1916.

Reissued Mar. 6, 1917.

14,266

2 SHEETS—SHEET 1.

Inventors
Joseph W. Bryan &
Daniel R. Bryan
By Geo A Byrne
Attorney

J. W. & D. R. BRYAN.

APPARATUS FOR SORTING HETEROGENEOUS MATERIAL.

APPLICATION FILED MAR. 25, 1916.

Reissued Mar. 6, 1917.

14,266.

2 SHEETS—SHEET 2.

Inventors,
Joseph W. Bryan &
Daniel R. Bryan,
By Jno. A. Payne
Attorney

UNITED STATES PATENT OFFICE.

JOSEPH W. BRYAN, OF NEW YORK, N. Y., AND DANIEL R. BRYAN, OF CHATHAM, NEW JERSEY; SAID JOSEPH W. BRYAN ASSIGNOR TO SAID DANIEL R. BRYAN.

APPARATUS FOR SORTING HETEROGENEOUS MATERIAL.

14,266. Specification of Reissued Letters Patent. Reissued Mar. 6, 1917.

Original No. 1,099,420, dated June 9, 1914, Serial No. 756,421, filed March 24, 1913. Application for reissue filed March 25, 1916. Serial No. 86,696.

*To all whom it may concern:*

Be it known that we, JOSEPH W. BRYAN and DANIEL R. BRYAN, both citizens of the United States, residing at No. 55 John street, New York city, State of New York, and Chatham, New Jersey, respectively, have invented certain new and useful Improvements in Apparatus for Sorting Heterogeneous Material, Such as That Which Makes up the Refuse of Cities, of which the following is a specification.

This invention relates to an apparatus for sorting heterogeneous material, and aims to provide improvements therein.

The invention provides a means especially adapted to separating and delivering to appropriate receptacles heterogeneous material such as that which makes up the refuse of cities and consisting mainly of ashes, cinders, paper, rags, glass articles, metallic substances, etc. It provides a means of simple and durable construction, which will not be clogged up by the service to which it is put and which operates efficiently to perform its intended functions. Other features of improvements will be hereinafter set forth.

An embodiment of the invention is set forth in the accompanying drawings, wherein—

Figure 1:
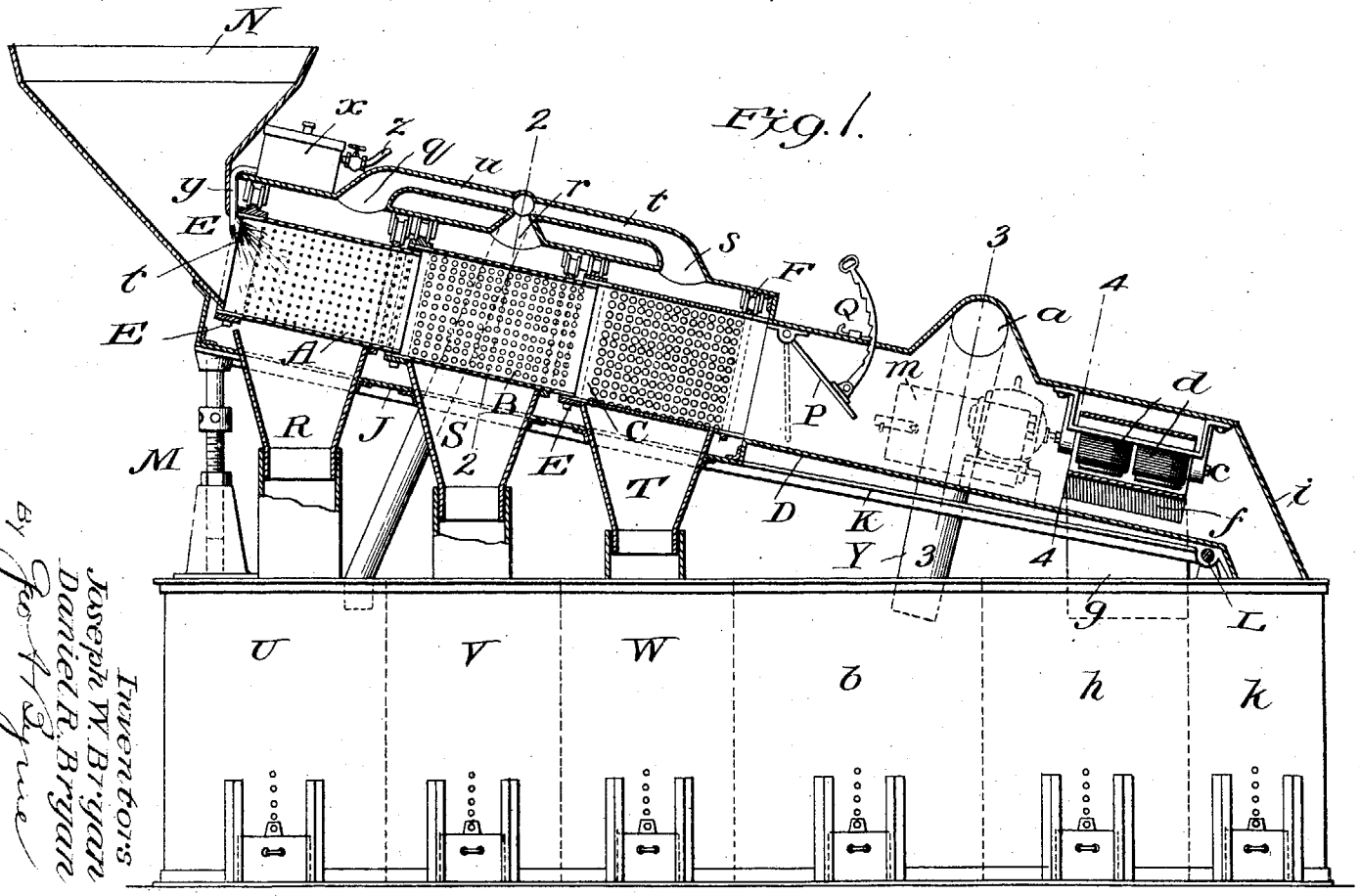
Figure 2:
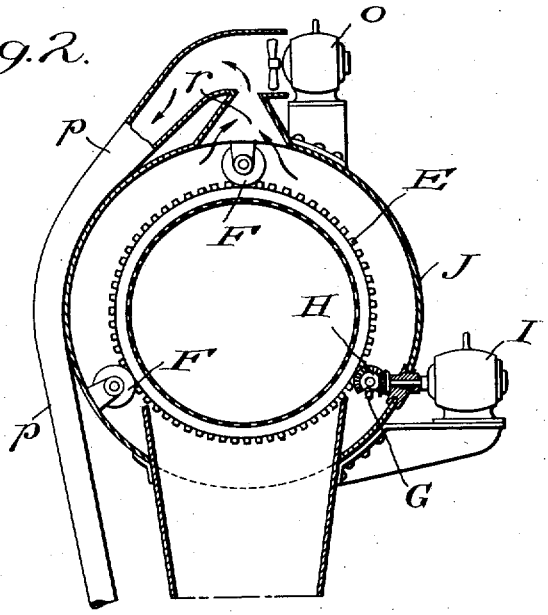
Figure 3:
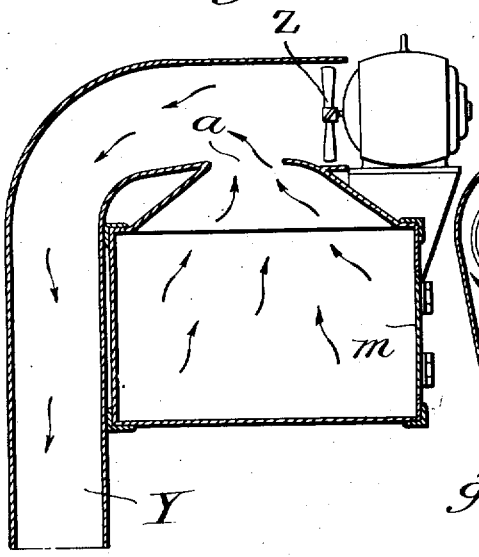
Figure 4:
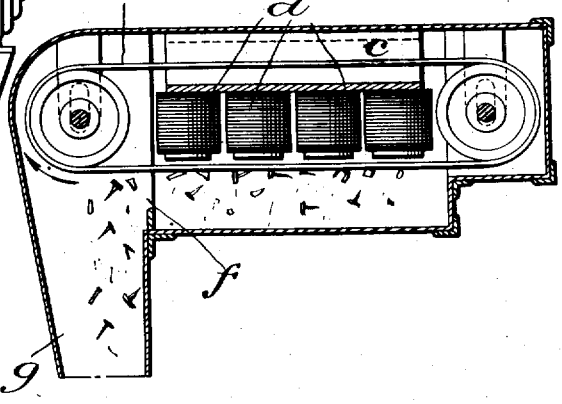

Figure 1 shows a longitudinal vertical section (with parts in elevation); and Figs. 2, 3 and 4, transverse sections on the lines 2—2, 3—3, and 4—4 respectively of Fig. 1.

In said drawings, A, B and C designate a series of rotatable screens, adapted to empty one into another, and D a chute preferably rectangular in cross section, into which the material passes after being acted upon by the screens.

The screens may be mounted in any suitable manner and suitable means are provided for rotating them. As here shown, each of the screens is provided with a circular rack E, running in grooved rollers F, and meshing with a gear G connected through bevel gears H to the shaft of an electric motor I.

The screens are preferably so proportioned that the delivery end of one fits within the receiving end of another, as for instance the delivery end of the screen A fits within the receiving end of the screen B thereby avoiding the formation of an obstruction by the ends of the screen. The screens are also preferably adapted to rotate at different relative speeds, and also to have the relative speeds varied. The screens will, ordinarily rotate at different relative speeds, owing to the fact that they are of different diameters, and being rotated by independent electric motors, variation in the relative speeds of rotation may be produced by increasing or diminishing the speed of operation of one or more of the motors. The first screen where the smallest particles are sifted out, should preferably receive the greatest speed of rotation; therefore it may be rotated at the fastest speed, and the succeeding screens at successively lesser speeds.

A casing J is preferably arranged around the hoppers to confine the clouds of dust and fine particles produced by the screening operation. The dust is preferably removed from the casing and for this purpose suitable means may be provided. As here shown, an electrically driven fan *o* is provided, which produces a current of air in a conduit *p*, which acts by inspiration, through orifices *q*, *r*, and *s*, over each of the screens and branch conduits *t* and *u*, to draw the dust-laden air from the casing J into the conduit *p* and carry it away, as to a bin or receptacle U hereinafter referred to.

The screens A, B and C and the chute D are preferably mounted upon a frame K arranged at a suitable incline so that the material may move through the apparatus under the influence of gravity. The frame K is furthermore preferably mounted at one end upon a pivoted bearing L and supported at its other end upon lifting means, such as a jack M, by which the inclination of the parts may be adjusted to the frictional resistance of the material operated on, which may vary from various causes, as for instance the humidity of the air and the proportions and nature of its ingredients.

A hopper N is preferably provided, into which the material to be sorted is dumped, and which delivers the same to the series of screens. Material passing from the hopper into the screen A is agitated and the screen being provided with small perforations, is partially sifted and has such particles as ashes and other fine particles removed therefrom. From the screen A the material passes to the screen B, where it is again agitated and further sifted. The screen B is provided with larger perforations than the screen A and such parts of the material as small cinders may be removed. From the screen B the material may pass to another screen C where it undergoes further agitation and sifting. The screen C having larger perforations than the screen B operates to remove the larger particles from the mass. From the screen C the material passes into the chute D, and a swinging door P adapted to be held in adjusted positions by means of a rack and dog Q may be provided for regulating the passage of the material through the chute.

The sifted material which is separated by the several screens, falls into a series of funnels R, S and T, arranged beneath the creens, and is delivered into separate bins or compartments U, V and W, where it may be collected. As the material passes into the chute D it is preferably first acted upon by a vacuum which draws the oversized material through the outlet opening of the screen. This vacuum may be, and preferably is, produced by the inspiration of a current of air, set in motion in a conduit Y, by an electrically driven fan Z, flowing past an orifice *a* in the upper part of the chute D (Fig. 3). The effect of this vacuum is to suck up light particles such as paper and rags and deliver them into a compartment or bin *b* into which the conduit Y empties and leave the residue of material as a substantially thin layer or stratum, whereby it is conditioned to have the metallic particles exposed for removal.

From the point where it is acted upon by the vacuum the material passes to a point where it is acted upon by an electromagnetic separator, *c*, the action of which is to separate metallic particles such as iron and the like from the mass. As shown (see Fig. 4) the electro-magnetic separator *c* preferably comprises a series of electro-magnets *d*, in front of which moves a belt *e*, preferably of non-magnetic material, such as ordinary canvas belt. Pieces of iron attracted by the electro-magnets will be carried to one side by the belt *e* through an opening *f* in the side of the chute D and dropped into a conduit *g* after being moved beyond the zone of influence of the magnets. From the conduit *g* the metallic particles are delivered into a bin or receptacle *h*.

After passing the electro-magnetic separator such parts of the mass as remain, and consisting mainly of bottles and particles of glass, will be delivered through a conduit *i* at the end of the chute D, into a bin or receptacle *k* where they are collected, and further separation may be made if desired. Each of the bins or receptacles U, V, W, *b*, *h* and *k*, is preferably provided with a door, through which the contents may be removed.

*m* is a door in the chute D through which access may be had to the interior thereof.

Means are provided for antiseptically treating the entire mass of refuse as it leaves the hopper. This means may comprise a tank *x* adapted to contain a suitable disinfectant *t*, a pipe *y* adapted to spray the disinfectant over the refuse as it enters the first screen. A pipe *z* is also preferably provided through which compressed air from a suitable source, may be admitted to the tank to force the disinfectant out through the pipe *y* over the material to be sprayed.

While we have illustrated and described one embodiment of the invention, the invention is not to be understood as limited thereto, as many changes and modifications may be made therein without departing from the spirit of the invention.

What we claim is—

1. In a machine of the class described, the combination of a hollow screen member having inlet and outlet openings, means for feeding material within said member, suction means for transversely withdrawing under-sized material through the walls of said screen, and suction means for simultaneously drawing over-sized material longitudinally of the screen member through said outlet.

2. In a machine of the class described, the combination of a tubular screen having inlet and outlet openings, means for feeding material within said screen, a discharge chute arranged at the outlet of the screen and in axial alinement with such screen, suction means for transversely withdrawing under-sized material through the walls of the screen, suction means connected with the discharge chute for simultaneously drawing over-sized material longitudinally of the screen and through the outlet thereof, and a device located between the outlet of the screen and the last-mentioned suction means for regulating the flow of material to the chute and to the last mentioned suction means.

3. In an apparatus for separating and recovering the ingredients of domestic refuse, the combination of means for preliminarily sizing material, said means including a screen for removing the heavy fine particles, and pneumatic means for removing the light fine particles, an extended supporting and transporting surface arranged to receive the oversized material from said preliminary sizing means and pneumatic means for drawing the oversized material from the preliminary sizing means and adapted to act on the material on the supporting and transporting surface for removing the larger lighter particles from the mass, and leave the residue as a substantially thin layer or stratum thereon, whereby the material is conditioned to have the metallic particles exposed for removal.

4. In an apparatus for separating and recovering the ingredients of domestic refuse, the combination of means for preliminarily sizing the material, said means including a screen for removing the heavy fine particles, and pneumatic means for removing the light fine particles, a support arranged to receive the oversized material from said preliminary sizing means, and pneumatic means for drawing the oversized material out of and away from the preliminary sizing means onto said support and adapted to remove the larger lighter particles from the mass, and leave the residue as a substantially thin layer or stratum thereon, whereby to condition the material to have the metallic particles exposed for removal.

5. In combination, means for preliminarily sizing material to be sorted, a support arranged to receive the oversized material from said means, and pneumatic means for simultaneously drawing the oversized material away from the preliminary sizing means onto said support and adapted to remove the larger lighter particles from the mass and leave the residue as a substantially thin layer or stratum thereon whereby to condition the material to have the metallic particles exposed for removal.

6. In combination, means for preliminarily sizing material to be sorted, an extended supporting and transporting surface arranged to receive the oversized material from said means, and pneumatic means for simultaneously drawing the oversized material from the preliminary sizing means and adapted to act on the material on the support, for removing the larger lighter particles from the mass, and leave the residue as a substantially thin layer or stratum, whereby to condition the material to have the metallic particles exposed for removal.

7. In combination, means for preliminarily sizing material to be sorted, a support arranged to receive the oversized material from said means, and means for creating a fluid current for simultaneously drawing the oversized material away from the preliminary sizing means onto said support and adapted to remove the larger lighter particles from the mass and leave the residue as a substantially thin layer or stratum thereon, whereby to condition the material to have the metallic particles exposed for removal.

8. In combination, means for preliminarily sizing material to be sorted, a support arranged to receive the oversized material from said means and means for creating a fluid current to act on the moving material longitudinally of its line of movement for simultaneously drawing the oversized material away from the preliminary sizing means onto said support, and adapted to remove the larger lighter particles from the mass and leave the residue as a substantially thin layer or stratum, whereby to condition the material to have the metallic particles exposed for removal.

9. In a machine of the class described, the combination of a hollow screen member having inlet and outlet openings, means for withdrawing the dust from the screen, a support arranged to receive the oversized material from said screen, and means for simultaneously drawing oversized material longitudinally of the screen through said outlet onto said support and adapted to remove the larger lighter particles from the mass, whereby the coarser residue is left as a substantially thin layer or stratum thereon and the metallic particles therein exposed for removal.

10. In a machine of the class described, the combination of a hollow screen member having inlet and outlet openings, suction means for withdrawing the dust from the screen, a support arranged to receive the oversized material from said screen, and means for simultaneously drawing the oversized material longitudinally of the screen through the outlet onto the support and adapted to remove the larger lighter particles from the mass on the support, whereby the coarser residue is left as a substantially thin layer or stratum and the metallic particles therein exposed for removal.

11. In a machine of the class described, the combination of a hollow screen member having inlet and outlet openings, a support arranged to receive the oversized material from the screen, means for feeding material within the screen and pneumatic means for drawing the oversized material longitudinally of the screen through said outlet onto the support and adapted to remove the larger lighter particles from the mass on the support whereby the coarser residue is left as a substantially thin layer or stratum and the metallic particles therein exposed for removal.

JOSEPH W. BRYAN.
DANIEL R. BRYAN.